United States Patent [19]

Lidy et al.

[11] Patent Number: 5,360,831
[45] Date of Patent: Nov. 1, 1994

[54] PREPARATION OF FOAM-IN-FABRIC ARTICLES

[75] Inventors: Werner A. Lidy, Terneuzen, Netherlands; Gérard Gatouillat, Buchillon, Switzerland; François M. Casati, Prevessin-Moens, France

[73] Assignee: Polyol International B.V., Rotterdam, Netherlands

[21] Appl. No.: 78,219

[22] PCT Filed: Dec. 16, 1991

[86] PCT No.: PCT/EP91/02407

§ 371 Date: Jun. 15, 1993

§ 102(e) Date: Jun. 15, 1993

[87] PCT Pub. No.: WO92/11130

PCT Pub. Date: Jul. 9, 1992

[30] Foreign Application Priority Data

Dec. 21, 1990 [GB] United Kingdom ............ 9027902.7

[51] Int. Cl.$^5$ .................. C08G 18/00; C08G 18/08
[52] U.S. Cl. .................. 521/99; 427/373; 428/423.1; 521/133; 521/155; 521/170
[58] Field of Search .............. 427/373; 428/423.1, 428/423.7; 521/99, 155, 170, 133

[56] References Cited

U.S. PATENT DOCUMENTS 4,304,872 12/1981 Tenhagen ........................ 521/52

Primary Examiner—Maurice J. Welsh
Assistant Examiner—Shelley A. Dodson

[57] ABSTRACT

The present invention concerns a process for the preparation of foam-in-fabric articles useful in furniture and automotive applications such as car seats, arm seats and head rests. According to the present invention a flexible or semi-flexible foam formulation is frothed with a non-reactive gas when poured onto a foam hacking of a composite cover, and allowed to rise and cure.

15 Claims, No Drawings

PREPARATION OF FOAM-IN-FABRIC ARTICLES

The present invention relates to a process for the preparation of all types of flexible or semi-flexible polyurethane foam-in-fabric articles useful in various furniture and automotive vehicle seating applications.

Most furniture and automotive vehicle seats, arm-rests and head-rests have traditionally been produced from moulded polyurethane foam cushions or parts wrapped subsequently in pre-cut and pre-sewn fabric covers. This "pre-cut and sew" method has drawbacks in that it is very labor intensive and the seats produced by this method tend to deteriorate rapidly or pockets form after repeated use. It is also difficult to achieve a consistently perfect shape from seat to seat and to produce concave contours.

To overcome deficiencies of the "pre-cut and sew" method, the so called "pour-in-place" method has been developed in the 1970's. The pour-in-place method involves pouring polyurethane foam reactants in a liquid form onto a pre-shaped cover and then allowing the foam to expand and cure to form an in-situ foamed moulded part. In the 1970's the pour-in-placmethod was applied for the production of office furniture and other simple-shaped articles such as tractor seating using impermeable PVC sheet covers. The pour-in-place method using fabric covers was introduced subsequently and is now referred to as foam-in-fabric method.

Initially, foam-in-fabric articles were produced using so called "barrier" techniques in which textile composites with or without foam interliners were laminated with a nonpermeable film backing, placed in a mould and shaped to fit the contoures of the mould by applying vacuum (see ICI Polyurethane Newsletter, 1990, Vol.4, No. 6; L. Deno, 1990, U. Tech, pp. 142–144; 33rd Annual Polyurethane Technical/Marketing Conference, Sep. 30–Oct. 3, 1990, D. Murphy et al, p. 172 and F. W. Schneider et al, p. 32; as well as EP-A-0 210 587; EP-A-1 901 828 and EP-A-0 181 604). The non-permeable film serves two purposes: (a) when vacuum is applied between the mould surface and the laminate, no air is sucked through the laminate and the laminate is pressed upon the mould surface and (b) the foam formulation which is poured in a liquid state on top of the laminate cannot penetrate or strike-through the non-permeable layer, thus avoiding uncomfortable stiffening and staining of the fabric. However, since the laminate is non-permeable to any fluid or gas, there is a definite drop in thermal comfort of the seats produced with this technique. This is a clear disadvantage for car seats because lack of "breathability" makes car seats particularly uncomfortable to use for an extended period of time.

To overcome the "breathability" problem, a so called "non-barrier" foam-in-fabric technique has recently been developed. According to the non-barrier technique, the fabric is laminated with a polyurethane slabstock foam layer of about 2 to 5 mm thickness but without the non-permeable film. The slabstock foam layer can be of two types, having virtually zero, or alternatively low air breathability, usually less than 1.0 cfm (cubic foot per minute) of air going through a foam sample (5×5×2.5 cm) as described in ASTM Method D-3574 p. 9 Ref.: Air Flow Test.

When a slabstock foam layer is used which has virtually zero air breathability it protects the fabric against liquid polyurethane foam reactants to almost the same extent that is achieved by using the nonpermeable film. However, the low porosity of the foam layer produces little improvement to thermal comfort of a car seat compared to the one produced by the barrier technique.

On the other hand, when a slabstock foam backing is used which has some air breathability, it is obvious that polyurethane reactants cannot be poured in liquid form since they would penetrate the foam layer creating a hardening effect and staining the fabric.

In order to avoid penetration of the foam layer two techniques are being currently used:

(1) Use of foam formulations which have a very fast cream time (cream foams) as described in FR-A-2,470,566. Such cream foams, however, create a problem as foam flow is reduced and for larger moulds filling problems occur. Thus, a cream foam technique is mainly applicable for production of small articles such as car head rests. Additionally, other problems are experienced such as fogging or chemical staining of the fabric by amine vapours due to the very high levels of amine catalysts required to produce the cream foam. The high catalyst level also leads to high foam compression set values especially after humid ageing.

(2) Use of a pre-expansion chamber. In this technique the liquid foam reactants, after mixing, are kept for a short time in a chamber where the reactions start. The reactive blend can therefore reach a creamy stage before being poured onto the fabric. A version of this device is described in U.S. Pat. No. 4,925,508. The disadvantage of this technique is that it is mechanically difficult to build a reusable pre-expansion chamber due to the plugging of movable parts by the reactants. That is the reason why in U.S. Pat. No. 4,925,508 the pouring nozzle acting as a pre-expansion chamber is made out of plastic (polyethylene or polystyrene) disposable after each pour. The use of a pre-expansion chamber described in U.S. Pat. No. 4,925,508 will particularly be inconvenient and uneconomical for use on a typical moulding line where several different parts would be produced.

It is known to use gases such as gaseous carbon dioxide as a blowing agents for moulded polyurethane foams. See for example EP-A-0 089 796, EP-A-0 251 803, U.S. Pat. Nos. 3,821,130, 4,906,672, EP-A-0 267 490, U.S. Pat. Nos. 4,483,894, 3,821,130, 3,862,879 and DE-OS-3,916,873. However, none of these references nor any other known reference describes or even suggests the use of a non-reactive gas in a process for making low density foam-in-fabric articles for cars or furniture.

It has now surprisingly been found that the use of an inert gas in a flexible foam formulation, and particularly a high resilience foam formulation, to froth the foam formulation when pouring the same onto a foam backing of the fabric eliminates penetration of the foam layer even with foam layer with air flows higher than 1.0 cfm, hereinafter referred to as "conventional foams", and does not reduce the flow of the foaming mass. This is totally unexpected and different from the cream-foam or the pre-expansion chamber techniques described above.

The present invention concerns a process for the preparation of pour-in-place articles, more particularly car or furniture seats, arm-rests and head rests, which process comprises pouring a flexible or a semi-flexible polyurethane, cold or hot cured, particularly high resilience, foam formulation onto a pre-shaped composite cover and allowing the same to rise and cure, characterized in that a sufficient amount of an inert gas is dissolved or dispersed in the foam formulation such that the liquid foam reactants leave the mixing head in a partially frothed state.

The inert gas can be added either to the polyol component and/or to the isocyanate component. The addition of the inert gas can be made either to the polyol tank and/or to the isocyanate tank. It is preferred to add the inert gas to the polyol component already blended with all other components (water, surfactants, catalyst, chain-extenders, additives etc.).

Conveniently the inert gas is introduced into the polyol component by mechanical nucleation. Any kind of nucleating device can be used such as for instance a pressurized vessel under between 1 and 10 bars gas pressure with a high speed hollow shaft agitator which brings gas from the top of the tank into the liquid and will disperse it there in small bubbles. Such devices are described in EP-A-0 322 032 and EP-A-0 344 501.

A nucleator with continuous circulation from the main tank though the nucleator being continuously loaded with a gas is also contemplated for use in the process of the present invention. Such an equipment is supplied by Krauss-Maffei as for instance nucleator unit GBE 20-L.

Direct injection of a gas into the polyol and/or isocyanate streams as described in EP-A-0 353 061 is also contemplated for use in the present invention although it is not preferred.

The use of carbon dioxide complexed with an amine as described in EP-A-0 121 850 is also contemplated by the present invention but in this case there is a limitation in the amount of carbon dioxide used due to the influence of the amine on foam reactivity and/or properties. This is also not a preferred embodiment of the present invention.

For a good performance of the process of the present invention it is important that the polyurethane foam formulation when leaving the mixing head is in a partially frothed state, i.e. with a liquid density (calculated by weighing the liquid and measuring the volume of the expanded liquid (polyol or isocyanate) at atmospheric pressure) of maximum 0.9 g/cm$^3$, preferably 0.7 g/cm$^3$ and lower.

Any type of polyurethane forming materials can be used in the process of the present invention.

Although the polyol used can be any alcohol, polyester, polyether or polyetheramine or other types having two or more reactive hydroxyl groups it is suitably a polyether polyol. The term polyether polyol which is well known in the art, includes alkylene oxide adducts of (1) low molecular weight diols and triols or naturally occurring polyols, (2) non-reducing sugars and derivatives thereof and (3) phosphoric, phosphorous and polyphosphonic acids. Examples of such adducts are the alkylene oxide adducts of ethylene glycol, propylene glycol, glycerol, trimethylol propane, the isomeric butanediols, hexanediols, octanediols and the like. Alkylene oxide adducts of pentaerythritol, sorbitol, arabitol, mannitol, alkyl glucoside, alkylene glycol, glycosides and glycosides and glycerol glucosides are also contemplated, as are adducts of alkylene diamines and hydrazines.

In general it is desirable that the alkylene oxide used to form the adduct is a lower alkylene oxide having from 2 to 4 carbon atoms. Preferred examples are ethylene oxide, propylene oxide, the butylene oxides or the mixtures thereof.

Average molecular weight of the polyol or polyols blend can vary between 2,000 and 15,000.

Polyether polyols containing additional polymeric matter, e.g. polymer polyols, may also be employed. Suitable polymer polyols are readily known to a person skilled in the art and are described for instance in U.S. Pat. Nos. 4,374,203, 4,855,330, 4,316,991 and GB-A-1,501,172. Mixtures of polyether polyols or mixtures of polyether polyols and polymer polyols can also be used.

The isocyanates which can be used in the process of the present invention are polyfunctional isocyanates well known to those skilled in the art. Suitable examples include individual or mixtures of the isomers of aromatic diisocyanates such as toluene diisocyanate (TDI), xylene diisocyanates and the like; difunctional aliphatic or cycloaliphatic isocyanates having between 2 and 18 carbon atoms, preferably 4–12 carbon atoms and isomers and oligomers of 4,4'-methylene diphenylisocyanate (MDI). Mixtures of TDI and polymeric MDI can also be used. In addition to the above, prepolymers of polyfunctional isocyanates and/or modified isocyanates can also be used.

Water is present in the process and functions as a blowing agent precursor, reacting with isocyanate moieties to generate carbon dioxide. The so generated carbon dioxide functions as a blowing agent providing for a cellular structure of the polyurethane.

Water is present in an amount to provide carbon dioxide in an amount sufficient to confer to the resulting polyurethane foam an overall free rise density of from about 10 to about 250 kilogram per cubic meter (kg/m$^3$). Advantageously water is present in an amount sufficient to confer to the resulting foam a density preferably from about 15, more preferably from about 25, most preferably from about 30 and up to about 100, more preferably up to about 80 kilograms per cubic meter.

Typically, the amount of water present providing for the nascent carbon dioxide in the amount necessary to provide resulting foam densities with such desired densities is from about 1.0 to about 12 parts by weight per 100 parts by weight of polyol used, preferably from 2 to about 6 parts.

In addition to the components described above, the polyurethane foam formulation may also contain other conventional components and additives which are routinely used in preparing flexible polyurethane foams especially high resilience foams.

Suitable catalysts which may be used in the process of this invention to promote the formation of urethane and urea groups include tertiary amines and organometallic compounds especially tin compounds. Exemplary of suitable tertiary amine catalysts are N,N-dimethylcyclohexylamine, N,N-dimethylbenzylamine, N,N-diethanolamine, bis(dimethylaminoethyl)ether and 1,4-diazobicyclo[2,2,2]octane; of tin compounds are stannous octoate and dibutyl tin dilaurate. Combinations of amine and/or tin compounds as catalyst may advantageously be employed in the process.

In the process of the present invention, an organosilicone surfactant may also be present as an additional component of the polyurethane-forming reaction mixture. When used, such surfactants are usually present in amounts up to about 5 parts by weight per 100 parts by weight of total polyol reactant. Suitable classes of silicone surfactants are poly(dimethylsiloxane) oils and the polysiloxane-polyoxyalkylene block copolymers wherein the respective blocks are joined through silicon-to-carbon or silicon-to-oxygen-to-carbon bonds and the respective polyoxyalkylene blocks are bonded to different silicon atoms of the polysiloxane backbone. The polysiloxane blocks may be trialkylsiloxy end blocked. In addition to the siloxy units to which the pendant polyoxyalkylene chains are bonded, the polysiloxane backbone is formed of difunctional siloxy units wherein the respective two remaining valences of silicon are satisfied by bonds to organic radicals. Illustrative of such organic radicals are the hydrocarbyl groups having from 1 to 12 carbon atoms including alkyl, aryl, aralkyl, bicycloheptyl and halogen substituted derivatives of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like.

The organosilicone component is preferably present in formulations in an amount between about 0.025 and about 2 parts by weight per 100 parts by weight of total polyol.

Other ingredients may also be included optionally. They include chain extenders, crosslinkers, colouring agents, fillers, flame retardants and the like.

Chain extenders are difunctional compounds containing active hydrogen (i.e. hydrogen which will react with isocyanate groups under the conditions used in foaming). Examples of suitable compounds containing active hydrogen are compounds containing hydroxyl and/or amine groups. Cross-linkers are compounds containing more than 2 active hydrogen atoms per molecule, preferably more than 3. Examples of such cross-linkers are diethanolamine, triethanolamine, N,N,N'N'-tetrakis-(2-hydroxypropyl) ethylene diamine, and phenol/formaldehyde/aniline condensation products. The active hydrogen content of the cross-linker or chain extender is preferably relatively high so as to allow a significant effect on hardness to be obtained without requiring an excessive amount of additive. The cross-linker or chain extender preferably has an active hydrogen content corresponding to a hydroxyl number of at least 100, more preferably 600 to 1500. Where the cross linker or chain extender is fed as an additive to one of the main reaction streams it is preferably used at the rate of 0.2 to 10 parts by weight per 100 parts of polyol.

It is also sometimes desirable to include various additives in the reaction mixture such as colouring agents, fillers, flame retardants and the like.

Suitable colouring agents are, for example carbon black, titanium dioxide, methyl blue, chromium red and the like.

Suitable fillers are latex, calcium carbonate, synthetic plastics including vinyl polymers such as, polyvinyl chloride, polystyrene and the like.

Suitable flame retardants are antimony oxide, tris (chloroethyl) phosphate, tricresyl phosphate, aluminum hydroxide, triphenyl phosphate, melamine and the like.

The components of the foam-forming reaction may be mixed together in any convenient manner, for example, by using any of the mixing equipment described in the prior art for the purpose. If desired non-interreactive components may be preblended so as to reduce the number of component streams which require intimately mixing with each other. It is generally advantageous to use a two-stream system whereby one stream comprises isocyanate component, whilst the second stream comprises all other components of the reaction mixture and which essentially do not interact prior to mixing with the isocyanate stream.

Suitable non-reactive gas which is employed in the present invention includes any gaseous element, compound or mixture thereof which is in the gaseous state under standard conditions of temperature and pressure, i.e. 25° C. and 1 atmosphere, including for example, carbon dioxide, nitrogen, oxygen, propane, pentane, methane, ethane, noble gases, chlorodifluoromethane or mixture thereof such as, for example, air and the like, provided such does not react with the urethane forming components. Air, nitrogen, and carbon dioxide and noble gases are preferred for use in the present invention with carbon dioxide being the most preferred.

The inert gas can be added to either the polyol or isocyanate stream or to both polyol and isocyanate streams prior to mixing the reactants streams.

The fabric used in the composite covers can be any of the natural or synthetic fabrics or any fabric made using any combination of natural and/or synthetic fibers. Typically fabric for car seats is made of combinations of wool and polyester. The fabric cover can be pre-shaped in the mould by vacuum and/or pressure, by thermoforming, by presewing, according for instance, to processes described in U.S. Pat. No. 3,878,277, FR-A-2,369,073, U.S. Pat. Nos. 4,377,609, 4,138,283 and FR-A-2,318,607.

The foam backing of the fabric cover preferably has a minimal thickness of 4 mm. Lower thickness will require special low breathability foam such as the ones described hereinbefore. The foam density of the foam backing is preferably at least 35 kg/m$^3$. It appears that higher foam densities will give lower risk or penetration to the fabric. The foam backing can be applied to the fabric either by gluing, by flame lamination, by sewing or by any suitable means.

It is clear that the present invention will also work with previous techniques such as impermeable PVC sheets, barrier film or zero breathability foam layers.

The present invention can be used with the fabric cover placed in a mould or just kept in shape by "holders" during the mould filling.

Nearly free-rise foams or very low in-mould pressure can also be obtained with the process of the present invention.

Because the "foam layer" has a high air flow venting can also be done though the fabric cover such as for instance in the process described in U.S. Pat. No. 4,925,508.

Multi-hardness foam techniques can also be employed to improve the seat comfort as described in EP-A-0 251 803, EP-A-0 287 903, EP-A-0 267 490, EP-A-0 068 820 and U.S. Pat. No. 4,190,697.

The invention is illustrated by the following Examples in which all parts and percentages are by weight, unless otherwise stated.

Foam formulations used in the following Examples are given in Table 1 below.

TABLE 1

| | Foam Formulations | | |
|---|---|---|---|
| | A | B | C |
| Polyol Component: | | | |
| Blend of VORANOL* CP 6001 and Polymer Polyol (styrene/acrylonitrile 15% total solids) | 100 | 100 | — |

TABLE 1-continued

|  | Foam Formulations | | |
|---|---|---|---|
|  | A | B | C |
| VORANOL* CP 6001 | — | — | 100 |
| Water | 2.8 | 2.8 | 3.4 |
| NIAX** A1 | 0.05 | 0.05 | 0.05 |
| DABCO*** 33 LV | 0.5 | 0.5 | — |
| DABCO*** XE 8510 | — | — | 0.5 |
| SILICONE RS** 171 | 1.0 | 1.0 | — |
| SILICONE DABCO DC 5043 | — | — | 1.0 |
| Diethanolamine (88%) | 0.5 | 0.5 | — |
| Diisopropanolamine | — | — | 0.9 |
| SPECFLEX* NK 904 Additive | 0.5 | 1.5 | — |
| SPECFLEX* NK 907 Additive | 2.0 | 2.0 | — |
| Isocyanate Component: | | | |
| 80/20% Blend of TDI (80/20) and Polymeric MDI (Index 100) | 40.9 | — | — |
| 100% TDI (80/20) (Index 100) | — | 35.1 | — |
| MDI Prepolymer (Index 85) | — | — | 53.8 |
| Reactivity/Conditions: | | | |
| Cream Time (s) | 7 | 6 | 7 |
| Gel Time (s) | 70 | 58 | 64 |
| Rise Time (s) | 140 | 100 | 98 |
| Polyol Component Temperature (°C.) | 25 | 25 | 25 |
| Isocyanate Component Temperature (°C.) | 25 | 25 | 25 |
| Polyol Component Dispensing Pressure (bars) | 150 | 150 | 150 |
| Isocyanate Stream Dispensing Pressure (bars) | 140 | 140 | 140 |
| Polyol Output (g/s) | 123 | 138 | 102 |
| Isocyanate Output (g/s) | 47 | 45 | 52 |
| Free Rise Foam Density (kg/m³) | 36 | 32 | 34.4 |

*Trademark of The Dow Chemical Company
**Trademark of Union Carbide Corporation
***Trademark of Air Products and Chemicals Inc.

EXAMPLE 1

A 300×300×100 mm large aluminium mold, heated to 55° C. was used. A conventional slabstock foam sheet, having a density of 37.5 kg/m³ thickness of 5 mm and an air flow of 3.5 cfm was placed onto the bottom of the mold. No fabric was used.

Each of the formulations given in Table 1 hereinbefore was frothed when poured onto the slabstock foam in the mould. Foam formulations were frothed by nucleating polyol tank with an inert gas at 2 bars pressure for 3 minutes using a hollow shaft agitator at 1,500 rpm. The isocyanate tank was kept under dry air pressure at 2 bars. The density of the nuclear polyol was measured under atmospheric pressure and is given in the Tables hereinafter in g/cm³ values.

Several pourings of each of the three foam formulations were made using an Admiral high pressure machine equipped with a Krauss-Maffei mixing head installed on the arm of an ASEA robot.

Two pouring patterns were used: (a) with the mixing head in a fixed position near the center of the mould (fixed pouring) or (b) with the mixing head moving from one side of the mould to the other in a straight line at a speed of 7-8 m/minute (stripwise pouring).

Two moulded foam densities (40 and 50 kg/m³) obtained by overpacking were used for each foam formulation. Demould time was 5 minutes for all foam formulations and densities. The distance between the outlet of the mixing head and the bottom of the mould during foam formulation pour was 20 cm.

Depth of penetration of the conventional slabstock foam backing by the poured flexible polyurethane foam reactants and the diameter of the penetration spot at the impact point of the flexible polyurethane foam reactants with the conventional slabstock foam backing were measured for each foam formulation.

The results obtained are given in Tables 2 and 3 below.

TABLE 2

Diameter (mm) of Penetration of Impact Point Fixed Pour

| Nucleation Gas Used | Foam dens. kg/m³ | FORMULATION A | | FORMULATION B | | FORMULATION C | |
|---|---|---|---|---|---|---|---|
| | | mm | Polyol Density | mm | Polyol Density | mm | Polyol Density |
| AIR | 40 | 41 | 0.76 | 32 | 0.71 | 20 | 0.63 |
| | 50 | 40 | 0.76 | 33 | 0.79 | 22 | 0.63 |
| NITROGEN | 40 | 30 | 0.73 | 34 | 0.72 | 38 | 0.80 |
| | 50 | 36 | 0.73 | 34 | 0.72 | 34 | 0.80 |
| CARBON DIOXIDE | 40 | 22 | 0.40 | 0 | 0.45 | 27 | 0.55 |
| | 50 | 22 | 0.34 | 0 | 0.40 | 23 | 0.55 |

TABLE 3

Depth of Penetration (mm) in Foam Backing of Stripwise Poured Foam of 50 kg/m³ Density

| FORMULATION A | | | FORMULATION B | | | FORMULATION C | | |
|---|---|---|---|---|---|---|---|---|
| Nucleation | mm | Polyol Density | Nucleation | mm | Polyol Density | Nucleation | mm | Polyol Density |
| Nitrogen | 4.0 | 0.73 | Nitrogen | 5.0 | 0.72 | Air | 1.0 | 0.63 |
| CO₂ | 1.0 | 0.34 | CO₂ | 2.0 | 0.45 | Nitrogen | 3.0 | 0.80 |
| | | | Air | 4.0 | 0.79 | CO₂ | 2.0 | 0.55 |

COMPARATIVE EXAMPLE A

The procedure of Example 1 was repeated with each foam formulation except that foam formulations were not nucleated with a gas. Instead, both polyol and isocyanate tanks were kept under dry air pressure at 2 bars.

The results obtained are given in Tables 4 and 5 below.

TABLE 4

Diameter (mm) of Impact Point Fixed Pour

| Nucleation | Foam Dens. (kg/m³) | Formulation A | Formulation B | Formulation C |
|---|---|---|---|---|
| No | 40 | 39 | 40 | 34 |
| NO | 50 | 43 | 38 | 32 |

TABLE 5

Depth of Penetration (mm) of Stripwise Poured Foam of 50 kg/m³ Density

| Formulation A | | Formulation C | |
|---|---|---|---|
| Nucleation | Depth of Penetration | Nucleation | Depth of Penetration |
| No | 4.5 | No | 4.5 |

Note:
Comparative Example A is not an Example of the present invention and is given for comparative purposes only.

EXAMPLE 2

The procedure of Example 1 was repeated with each foam formulation except that a polyester foam having density of 48 kg/m³ and low air breathability (below 1 cfm) which was flame laminated onto a fabric designed for car seats was used in the mould instead of the conventional slabstock foam. Thickness of the polyester foam after flame lamination was 4 mm and fabric weight was measured at 187 g/m².

The results obtained are given in Table 6 below.

TABLE 6

| Foam Density | Nucleation | POURING PATTERN | FORMULATION A mm | FORMULATION A Polyol Density | FORMULATION B mm | FORMULATION B Polyol Density | FORMULATION C mm | FORMULATION C Polyol Density |
|---|---|---|---|---|---|---|---|---|
| 40 | $CO_2$ | fixed | 1.5 | 0.33 | | | | |
| 50 | $CO_2$ | fixed | 1.0 | 0.33 | | | | |
| 50 | $CO_2$ | stripwise | 1.0 | 0.33 | | | | |
| 50 | $CO_2$ | fixed | | | 3.0 | 0.67 | | |
| 40 | $CO_2$ | fixed | | | 3.0 | 0.67 | | |
| 50 | $CO_2$ | stripwise | | | 2.0 | 0.67 | | |
| 40 | $CO_2$ | fixed | | | | | 2.0 | 0.55 |
| 50 | $CO_2$ | fixed | | | | | 3.0 | 0.55 |
| 50 | $CO_2$ | stripwise | | | | | 1.0 | 0.55 |

COMPARATIVE EXAMPLE B

The procedure of Example 1 was repeated using foam formulation B except that the foam formulation was not nucleated with a gas and a complex polyester foam having density of 48 kg/m³ and low air breathability (below 1 cfm) which was flame laminated onto a fabric designed for car seats was used in the mould instead of the conventional slabstock foam. Thickness of the polyester foam after flame lamination was 4 mm and fabric weight was measured at 187 g/m².

The results are given in Table 7 below.

TABLE 7

| Foam Density | Nucleation | Pouring Pattern | Formulation B (Depth of Penetration mm) |
|---|---|---|---|
| 40 | No | fixed | 4.0 |
| 50 | No | fixed | 4.0 |

Note: Comparative Example B is not an Example of the present invention and is given for comparative purposes only.

As can be seen from the data given in the preceding Tables, the main problem associated with pouring foam reactants onto a foam sheet or onto a foam sheet backing a fabric is penetration at the impact point. This defect which causes hardened point or zone, depending on pour pattern, is more important for higher foam densities obtained by overpacking because of the longer pour time (2.95 s vs. 1.5 s on average) and higher pressure in the mould. This defect occurs with all three types of foam formulations but is considerably reduced by frothing the foam formulation prior to pouring it onto the foam sheet or a foam sheet backing a fabric.

We claim:

1. A process for the preparation of a pour-in-place articles which process comprises pouring a flexible or semi-flexible polyurethane foam formulation onto a pre-shaped composite cover and allowing the foam to rise and cure, characterized in that an inert gas is dissolved or dispersed in the flexible or semi-flexible polyurethane foam formulation such that liquid foam reactants leave a mixing head in a partially frothed state.

2. A process according to claim 1, characterized in that the non-reactive gas is dissolved or dispersed in a polyol component of the foam formulation.

3. A process according to claim 1, characterized in that the non-reactive gas is dissolved or dispersed in an isocyanate component of the foam formulation.

4. A process according to claim 1, characterized in that inert gas is dissolved or dispersed in both the polyol and isocyanate components of the foam formulation.

5. A process according to any one of claims 1 to 4, characterized in that the non-reactive gas is air, nitrogen or carbon dioxide.

6. A process according to claim 1, characterized in that the non-reactive gas is carbon dioxide.

7. A process according to claim 1, characterized in that a liquid density of the foam formulation reactants leaving the mixing head is maximum 0.8 g/cm³.

8. A process according to claim 1, characterized in that the foam formulation is poured in at one point or stripwise.

9. A process according to claim 1, characterized in that the flexible polyurethane foam formulation is a high resilience foam formulation.

10. A process according to claim 1, characterized in that the foam backing of the pre-shaped composite cover is a slabstock foam having minimum density of 35.0 kg/m³ and thickness of at least 4 mm.

11. A process according to claim 10, characterized in that the foam backing of the pre-shaped composite cover has an air flow of minimum 1 cfm.

12. A process according to claim 1, characterized in that the foam backing of the pre-shaped composite cover is a polyester or polyether foam having air flow of less than 1 cfm.

13. A process according to claim 12, characterized in that the foam backing of the pre-shaped composite cover is a complex polyester or polyether foam laminated to a fabric.

14. A process according to claim 1, characterized in that the pre-shaped composite cover is placed into a mould or is just kept in shape by holders during pouring of the foam formulation.

15. A process according to claim 1, characterized in that the foaming mass can vent through the pre-shaped composite cover or build low in-mould pressure.

* * * * *